United States Patent [19]

Sabin

[11] Patent Number: 5,626,051

[45] Date of Patent: May 6, 1997

[54] PROCESS AND DEVICE FOR FORMING A CORRUGATED METAL SHEET AND CORRUGATED METAL SHEET OBTAINED BY THIS PROCESS

[75] Inventor: Dominique Sabin, Herbeville, France

[73] Assignee: Packinox, Paris, France

[21] Appl. No.: 427,308

[22] Filed: Apr. 24, 1995

[30] Foreign Application Priority Data

Apr. 22, 1994 [FR] France ................... 94 04891

[51] Int. Cl.$^6$ .............. B21B 9/00; B21C 37/02; B21D 26/02; B21J 5/04
[52] U.S. Cl. .............. 72/379.6; 72/56; 72/38; 72/379.2
[58] Field of Search ............. 72/56, 63, 38, 72/46, 379.6, 379.2, 706, 363; 29/421.2, 423, 424; 228/106; 428/131, 179, 182

[56] References Cited

U.S. PATENT DOCUMENTS

| 3,670,393 | 6/1972 | Almond ................... 29/423 |
| 3,785,788 | 1/1974 | Haggberg et al. ........... 29/423 |
| 4,597,916 | 7/1986 | Chen ..................... 428/182 |
| 4,604,247 | 8/1986 | Chen et al. ............... 428/182 |

FOREIGN PATENT DOCUMENTS

| 2397245 | 2/1979 | France . |
| 1777210 | 4/1971 | Germany . |
| 2263274 | 7/1974 | Germany . |
| 8102128 | 8/1981 | WIPO ................... 72/363 |

Primary Examiner—Lowell A. Larson
Assistant Examiner—Rodney A. Butler
Attorney, Agent, or Firm—Pollock, Vande Sande & Priddy

[57] ABSTRACT

A process for forming a corrugated metal sheet (1) which includes perforations (2) over its entire surface, in which process the metal sheet (1) is laid on a die (11) provided with corrugations (11b), the space (13) delimited beween the metal sheet (1) and the die (11) is sealed by blocking off the perforations (2) in the metal sheet (1), an explosive charge (16) with remote-controlled firing is placed on top of the upper face of the metal sheet (1), a vacuum is created in the space (13) delimited between the metal sheet (1) and the die (11), the entire assembly is immersed in a firing tank filled with water, and firing of the explosive charge is initiated, so that the energy release presses the metal sheet (1) against the die (11). The invention also includes a device for forming a corrugated metal sheet and a corrugated metal sheet formed by the process.

6 Claims, 2 Drawing Sheets

PROCESS AND DEVICE FOR FORMING A CORRUGATED METAL SHEET AND CORRUGATED METAL SHEET OBTAINED BY THIS PROCESS

FIELD OF THE INVENTION

The subject of the present invention is a process and a device for forming a corrugated metal sheet which includes perforations over its entire surface.

BACKGROUND OF THE INVENTION

This type of corrugated and perforated sheet is used, for example, in baskets of catalytic reactors designed to promote contact between a catalyst and a product to be treated.

For this kind of application, the sheets have large dimensions, of the order of 13 meters in length by 2 meters in width.

One of the processes used for forming large-sized sheets is explosive forming.

The process comprises the steps of laying the metal sheet on a corrugated die, keeping the metal sheet on the die and creating a vacuum in the space delimited between the said metal sheet and the die.

Next, an explosive charge with remote-controlled firing is arranged on top of the upper face of the metal sheet and the entire assembly is immersed in a firing tank filled with water.

The firing of the explosive charge causes an energy release which has the effect of pressing the metal sheet against the die and thus of forming the corrugations on the metal sheet.

However, the explosive forming of corrugated and perforated sheets poses problems owing to the presence of the perforations which prevent the creation of a vacuum in the space delimited between the metal sheet and the die, so that an air cushion remains between the metal sheet and the die, preventing the metal sheet from being pressed against the die.

To date, a hydraulic press has been used to form corrugated and perforated metal sheets.

Hydraulic presses make it possible to develop large forces, but they are limited to the forming of small-sized sheets because of the constraints imposed by the mechanical elements which make up the presses.

SUMMARY OF THE INVENTION

The Invention of the invention is therefore to remedyies these drawbacks by providing a process and a device for forming large-sized corrugated metal sheets which include perforations over their entire surface.

One object of the invention is a therefore a process for forming a corrugated metal sheet which includes perforations over its entire surface, in which process:

the metal sheet is laid on a corrugated die;

a frame is laid on the upper peripheral edge of the metal sheet;

the metal sheet is clamped between the frame and the die;

an explosive charge with remote-controlled firing is placed on top of the upper face of the metal sheet;

a vacuum is created in the space delimited between the metal sheet and the die after this space is sealed by blocking off the perforations in the metal sheet;

the whole assembly is immersed in a firing tank filled with water;

the firing of the explosive charge is initiated so that the energy release presses the metal sheet against the and die;

the corrugated metal sheet is removed from the die.

According to other characteristics of the invention:

the perforations are blocked off by depositing, on the face of the metal sheet opposite to that facing the die, a plastic film extending over the entire surface of the metal sheet;

the perforations are blocked off by depositing, on the face of the metal sheet opposite to that facing the die, a peelable coating spread out over the entire surface of the metal sheet.

Another subject of the invention is a device for forming a corrugated metal sheet which includes perforations over its entire surface, of the type comprising:

a die provided with corrugations on its face intended to receive the metal sheet;

means for clamping the metal sheet to the die;

means for creating a vacuum in the space delimited between the metal sheet and the die and;

and an explosive charge with remote-controlled firing intended to be placed on top of the upper face of the metal sheet.

The device comprises means for blocking off the perforations in the metal sheet in order to seal the space delimited between the metal sheet and the die.

According to other characteristics of the invention:

the means for blocking off the perforations in the metal sheet are formed by a plastic film deposited on the face of the metal sheet opposite to that facing the die and extending over the entire surface of the metal sheet;

the means for blocking off the perforations in the metal sheet are formed by a peelable coating deposited on the face of the metal sheet, opposite to that facing the die and spread out over the entire surface of the metal sheet.

Another object of the invention is a corrugated metal sheet which includes perforations over its entire surface, and which is a formed by the process described hereinabove process mentioned hereinabove.

BRIEF DESCRIPTION OF THE DRAWINGS

The invention will be described in more detail hereinbelow, with reference to the appended drawings given solely by way of example, and in which.

DETAILED DESCRIPTION

Figure 1:
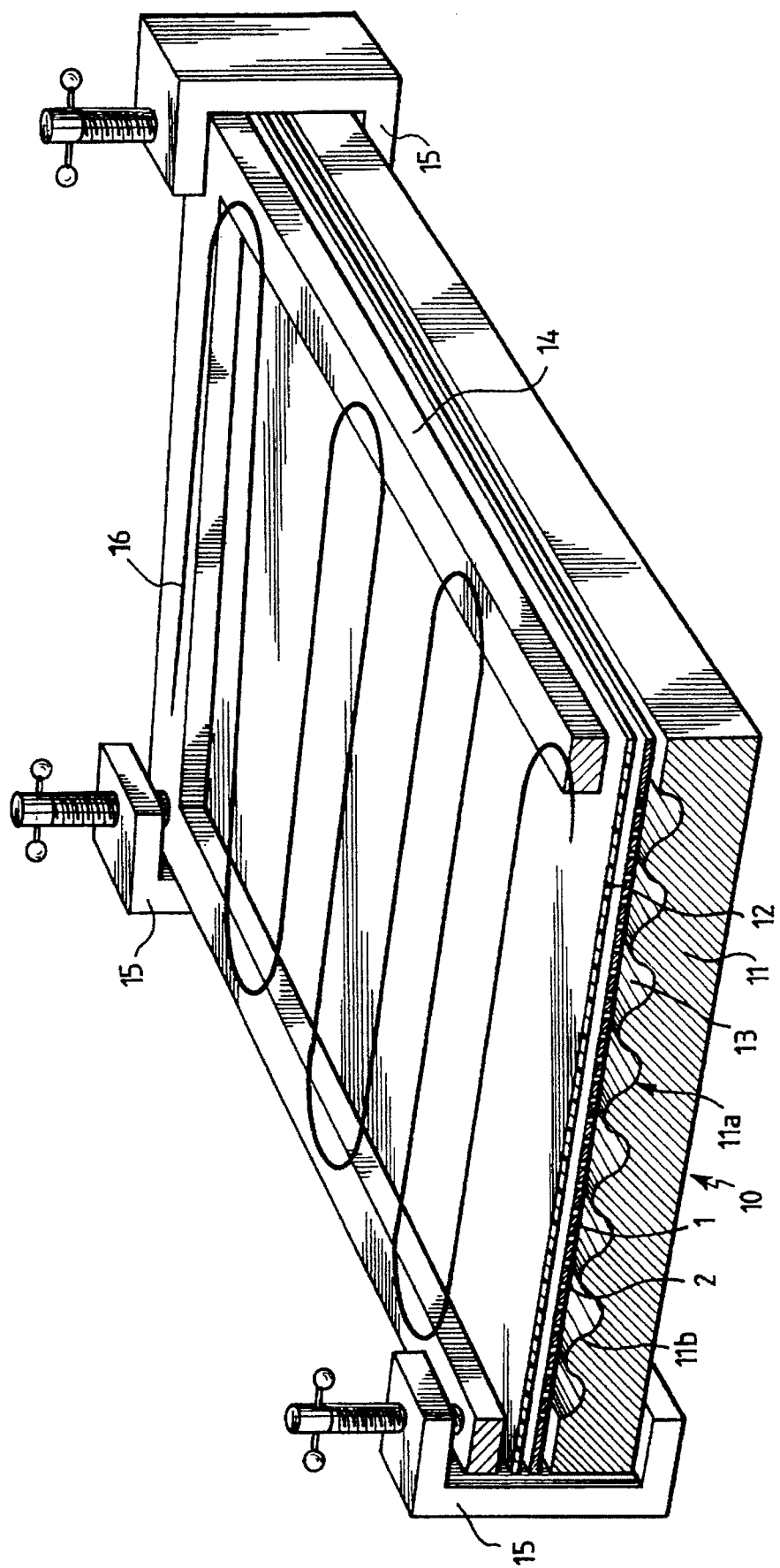
FIG. 1 is a partial, schematic and perspective view of a forming device according to the invention.

FIG. 1 depicts a device for the explosive forming of a metal sheet 1 which includes perforations 2 over its entire surface.

Figure 2:
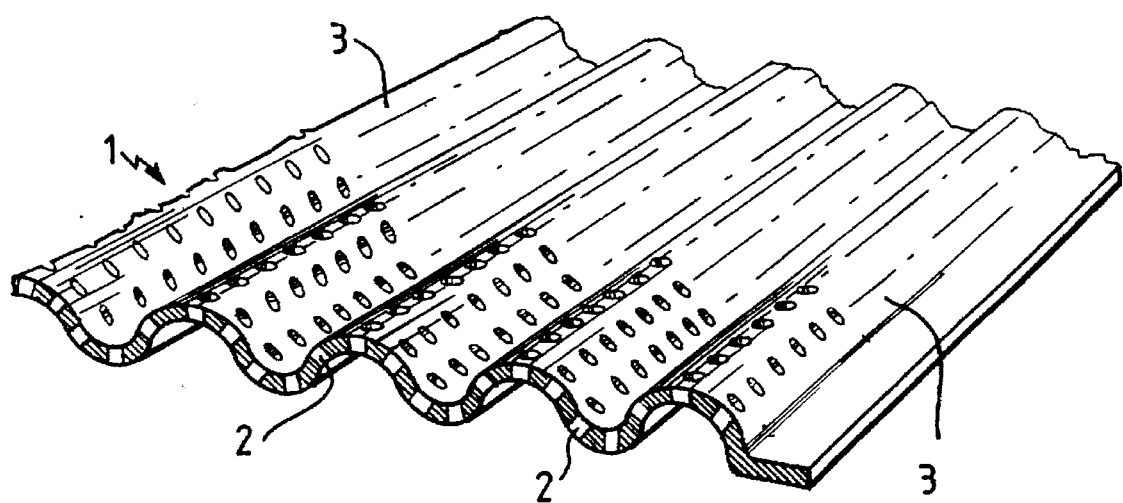
FIG. 2 is a partial perspective view of a corrugated and perforated sheet in accordance with the invention.

The metal sheet 1 includes, after forming by means of the device according to the invention, corrugations 3, as depicted in FIG. 2.

The forming device 10, depicted schematically diagrammatically in FIG. 1, comprises a die 11 provided, on its face 11a intended to receive the metal sheet 1, with corrugations 11b extending over the entire surface of the said die 11.

Means for blocking off the perforations 2 in the metal sheet 1 are placed on the face of the said metal sheet opposite 1 to that facing the die 11 so as to seal the space 13 delimited between the metal sheet and the die 11.

According to a first embodiment, the means for blocking off the perforations 2 in the metal sheet 1 are formed by a plastic film or peelable coating 12 (FIG. 1) deposited on the face of the metal sheet 1 opposite to that facing the die 11 and extending over the entire surface of the metal sheet 1.

Other means for blocking off the perforations 2 in the metal sheet may obviously be used.

A frame 14 is placed on top of the plastic film 12, on the peripheral edge of the metal sheet 1.

The entire assembly constituted by the die 11, the metal sheet 1, the plastic film or coating 12 and the frame 14, is clamped by clamps 15 positioned around the frame 14 and distributed at an equal distance from each other.

The space 13 delimited between the die 11 and the metal sheet 1 is connected, by means of a pipe, to a vacuum pump, (not shown).

An explosive charge 16 with remoted-controlled firing is placed on top of the plastic film 12 and at a distance from it.

The explosive charge 16 is constituted, for example, by a cord arranged in undulating fashion on top of the metal sheet 1.

The forming device may be moved by slings (not shown), connected to the frame 14.

The procedure for forming in order to form the corrugations 3 by means of the device according to the invention, is as follows.

First, the metal sheet 1 provided with perforations 2 is laid on the die 11 and the space 13 is sealed by blocking off the perforations 2 in the metal sheet 1 by depositing, on the face of the metal sheet 1 opposite to that facing the die 11, a plastic film or peelable coating 12 over the entire surface of the metal sheet 1.

Next, the metal sheet 1 and the plastic film or coating 12 are clamped between the frame 14 and the die 11 by means of clamps 15 and the explosive charge 16 with remote-controlled firing is placed on top of the upper face of the metal sheet 1.

The entire assembly is immersed in a firing tank (not shown) filled with water and a vacuum is created in the space 13.

The means for blocking off the perforations 2 seal the space 13, thereby making it possible to maintain the vacuum therein this space 13.

The firing of the explosive charge 16 is initiated remotely, and the explosion thus produced presses the metal sheet 1 against the die 11, thereby enabling the corrugations 3 to be formed on it.

Next, the entire assembly is removed from the firing tank and the metal sheet 1, which includes the corrugations 3, is extracted from the die 11.

By use of the explosive-forming process and device according to the invention, it is possible to produce large-sized corrugated metal sheets which include perforations.

These corrugated metal sheets are intended, for example, to form bundles of plates for plate heat exchangers.

I claim:

1. Process for forming a corrugated metal sheet (1) which includes perforations (2) over an entire surface of said metal sheet, said process comprising the steps of:

(a) positioning said metal sheet (1) on a corrugated die (11);

(b) positioning a frame (14) on an upper peripheral edge of said metal sheet (1);

(c) clamping said sheet (1) between said frame (14) and said die (11);

(d) placing an explosive charge (16) with remote-controlled firing on top of an upper face of said metal sheet (1);

(e) creating a vacuum in a space (13) delimited between said metal sheet (1) and said die (11);

(f) sealing said space (13) by blocking off said perforations (2) in said metal sheet (1);

(g) immersing an assembly of said metal sheet, said frame and said die in a firing tank filled with water;

(h) initiating firing of said explosive charge (16) so that an energy release presses said metal sheet (1) against said die (11); and (i) removing said corrugated metal sheet (1) from said die (11).

2. Process according to claim 1, wherein said perforations (2) are blocked off by depositing, on a face of said metal sheet (1) opposite to a face facing said die (11), a plastic film extending over an entire surface of said metal sheet (1).

3. Process according to claim 1, wherein said perforations (2) are blocked off by depositing, on a face of said metal sheet (1) opposite to a face facing the die (11), a peelable coating spread out over an entire surface of said metal sheet (1).

4. Device for forming a corrugated metal sheet (1), which includes perforations (2) over an entire surface of said metal sheet, said device comprising (a) a die (11) provided with corrugations (11b) on a face (11a) of said die intended to receive said metal sheet (1);

(b) means (14, 15) for clamping said metal sheet (1) to said die (11);

(c) means for creating a vacuum in a space (13) delimited between said metal sheet (1) and said die (11);

(d) means (12) for blocking off said perforations (2) in said metal sheet (1) in order to seal said space (13) delimited between said metal sheet (1) and said die (11); and (e) placing an explosive charge (16) with remote-controlled firing on top of an upper face of said metal sheet (1).

5. Device according to claim 4, wherein said means (12) for blocking off said perforations (2) in said metal sheet (1) are formed by a plastic film deposited on a face of said metal sheet (1) opposite to a face facing said die (11) and extending over an entire surface of said metal sheet (1).

6. Device according to claim 4, wherein said means (12) for blocking off said perforations (2) in said metal sheet (1) are formed by a peelable coating deposited on a face of said metal sheet (1) opposite to a face facing said die (11) and spread out over an entire surface of said metal sheet (1).

* * * * *